United States Patent
Brown et al.

[15] 3,691,198
[45] Sept. 12, 1972

[54] SYNTHESIS OF 1-SUBSTITUTED-3-HALOPYRROLIDINES

[72] Inventors: Bernard Bean Brown, Westfield; Donald Carl Ruopp, Belleville, both of N.J.

[73] Assignee: CPC International Inc.

[22] Filed: Dec. 21, 1970

[21] Appl. No.: 100,506

Related U.S. Application Data

[63] Continuation-in-part of Ser. No. 748,618, July 30, 1968, abandoned.

[52] U.S. Cl.........260/326.8, 260/313.1, 260/654 R, 260/999
[51] Int. Cl. .............................................C07d 27/04
[58] Field of Search...................................260/326.8

[56] References Cited

UNITED STATES PATENTS 3,318,903   5/1967   Swidinsky et al.....260/326.62

*Primary Examiner*—Alex Mazel
*Assistant Examiner*—Joseph A. Narcavage
*Attorney*—Frank E. Robbins, Joseph Shekleton, Janet E. Price, Robert D. Weist, Martha A. Michaels and Dorothy R. Thumler

[57] ABSTRACT

A method of preparing 1-substituted-3-halopyrrolidines, particularly a method of preparing said pyrrolidines by reacting a 1-substituted-$\Delta^3$-pyrroline with a concentrated hydrogen halide aqueous solution at a temperature greater than 100°C. In a preferred embodiment, a supersaturated hydrobromic acid solution is utilized, i.e., one containing about 60 percent hydrogen bromide. The 1-substituted-$\Delta^3$-pyrroline reactant is preferably made by reaction of a cis-1,4-dihalobutene-2 with a primary amine whereupon cyclization takes place. Said 1-substituted-3-halopyrrolidines are intermediates useful in making anticholinergics and like materials.

38 Claims, No Drawings

SYNTHESIS OF 1-SUBSTITUTED-3-HALOPYRROLIDINES

This application is a continuation-in-part of application, Serial No. 748,618, filed July 30, 1968, now abandoned.

Interest in 1-substituted-3-halopyrrolidines such as 1-alkyl-3-halopyrrolidines has been stimulated by their usefulness as intermediates for the preparation of central nervous system stimulants, anti-spasmodics, ganglionic stimulants, anti-cholinergics, and parasympathetic depressants.

In particular, a number of drugs are known which inhibit the actions of acetyl-choline on structures enervated by postganglionic cholinergic nerves and on smooth muscles that respond to acetylcholine but lack cholinergic enervation. These agents are generically known as antimuscarinic agents and demonstrate a competitive or surmountable antagonism to acetylcholine and other muscarinic agents. In essence, these drugs can inhibit muscarinic actions of acetylcholine and other choline esters. Such drugs have also been variously termed by a number of other names such as anticholinergic drugs.

One particular drug of this class is known as glycopyrrolate sold under the trade name "Robinul". This drug has the following structure:

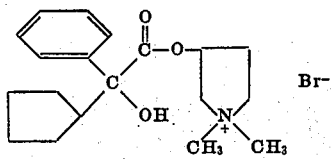

The above drug is a potent anticholinergic drug type used for the treatment of the gastro-intestinal tract and is particularly useful in the treatment of peptic ulcers. While it is not entirely understood exactly how this drug works it is assumed that it behaves along the line of the acid-peptic theory, and it is strongly felt that proper therapy is achieved through an antacid effect. The just mentioned drug is particularly effective at extremely low concentrations, and therefore does not induce undesirable side effects such as dizziness, restlessness, irritability, disorientation, depression, and other undesirable side effects, generally due to a blocking of responses to parasympathetic activity at all effector organs. Most drugs of this type produce the undesirable side effects of generalized parasympathetic block.

The intermediate used to prepare glycopyrrolates is a 1-substituted-3-halopyrrolidine. For example, the commercial glycopyrrolate can be prepared by reaction of 1-methyl-3-chloropyrrolidine with the sodium salt of alpha-phenylcyclopentaneglycolic acid. The resultant compound is then quaternized with methyl bromide to produce the commercial anti-cholinergic compound shown above.

The 1-alkyl-3-halopyrrolidine compound is also an intermediate used to prepare another important drug, doxapram which is made via a complicated multi-step chemical synthesis. This chemical, which is a respiratory stimulant for intravenous administration, has the following structure:

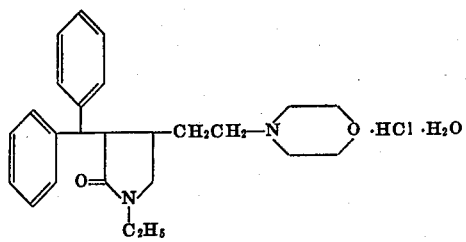

Many theoretical routes to the 1-alkyl-3-halopyrrolidine intermediate are possible; however, most are quite costly and involve several steps. For example, the 1-substituted-3-chloropyrrolidine may be prepared by chlorination of a 1-substituted-3-pyrrolidinol by reaction with such reagents as thionyl chloride. However, the 1-substituted-3-pyrrolidinols are prepared only through an extremely complicated sequence of steps. The multi-step synthesis involves a greater number of individual and difficult steps, leading to an overall poor yield of the desired 1-substituted-3-chloropyrrolidine.

It would be a considerable advance in the art if a new and simplified method of achieving 1-substituted-3-halopyrrolidines were found. If such pyrrolidines could be made in a minimum number of steps, and particularly could be achieved in relatively high yields without isolating intermediates, such process would be a distinct advance in the art.

It therefore becomes an object of the invention to provide a method of preparing a 1-substituted-3-halopyrrolidine.

A specific object of the invention is to prepare the above pyrrolidine in a simplified procedure which does not involve exotic reagents or sophisticated tailor-made equipment.

Another object of the invention is to provide a method of preparing a 1-substituted-3-halopyrrolidine in relatively high yields through an intermediate which need not be isolated.

Yet another object of the invention is to provide a method of making a 1-substituted-3-halopyrrolidine from a starting material which is easily prepared by known techniques.

Other objects will appear hereinafter.

BROAD DESCRIPTION OF THE INVENTION

In accordance with the invention a new procedure for making 1-substituted-3-halopyrrolidines has been discovered. In its broadest aspects the process involves effecting reaction of a 1-substituted-$\Delta^3$-pyrroline with a concentrated hydrogen halide aqueous solution at a temperature greater than 100°C. and recovering said 1-substituted-3-halopyrrolidine product.

In a greatly preferred embodiment the 1-substituted-$\Delta^3$-pyrroline starting material is made by a cyclization reaction of cis-1,4-dihalobutene-2 with a primary amine. The 1-substituted-$\Delta^3$-pyrroline is most preferably reacted with a supersaturated hydrobromic acid solution containing greater than about 55 percent hydrogen bromide or a concentrated hydrochloric acid solution. The reaction with the supersaturated hydrobromic acid appears to be much preferred due to greater reactivity and greater total overall yields.

DETAILED DESCRIPTION OF THE INVENTION

The first step in the reaction sequence set out here involves appropriate preparation of a 1-substituted-Δ³-pyrroline. While this starting material can be prepared via a number of techniques we have found the most preferred to by cyclization of a cis-1,4-dihalobutene-2 by means of reaction with a primary amine. The preferred butene due to relative low cost and availability is the dichloro derivative.

The primary amine reactant may be greatly varied, and a wide number of primary amines may be utilized here which are sufficiently reactive with the butene compound to effect ring closure. Thus, by varying the particular primary amine one can thus conveniently vary the type of the 1-substituent present in the resultant 1-substituted-Δ³-pyrroline. Thus, said primary amines as methylamine, ethylamine, isopropylamine, butylamine, cyclohexylamine, phenylamine, substituted phenylamines, benzylamine, cyclopentylamine, higher alkylamines, such as dodecylamine, etc. may be used here. Preferred primary amines are alkyl amines, and particularly lower alkyl amines such as those containing from one to four carbon atoms, and aralkylamines such as benzylamine and substituted benzylamines. Most preferred here are methylamine, ethylamine, and benzylamine.

It will be noted that the organic group of the primary amine reactant is a hydrocarbyl group which is the 1-substituent of the 1-substituted-3-halopyrrolidine and of the 1-substituted-Δ³-pyrroline and that this 1-substituent is, accordingly, an alkyl group having from one to 12 carbons, a phenylalkyl group having from seven to 10 carbons, or a cycloalkyl group having from five to eight carbons.

The cis-1,4-dihalobutene-2 may itself be made via a number of routes, such as by reaction of hydrogen chloride with 1,4-dihydroxybutene-2. Normally, this reaction is carried out by applying external cooling, particularly at the intial stages of the exothermic reaction. The dihalo compound, in this case, dichloro derivative, may then be distilled out of the reaction mass.

The 1-substituted-Δ³-pyrroline likewise is easily prepared from the cis-1,4-dihalobutene-2. For example, an appropriate amine may be added to the dichloro compound while cooling the reaction vessel. The pyrroline derivative may be then isolated such as by washing with ethyl ether and then distilling the desired product.

Lastly, the pyrroline, which may or may not be isolated after being made from the unsaturated dihalo compound is reacted with a concentrated hydrogen halide aqueous solution at a temperature greater than 100°C. and the 1-substituted-3-halopyrrolidine product recovered. Preferred concentrated hydrogen halide solutions include concentrated hydrochloric acid and supersaturated hydrobromic acid solutions. Thus, commercially available concentrated hydrochloric acid may be used. However, the most preferred hydrogen halide solution is a supersaturated hydrobromic acid solution containing at least about 55 percent hydrogen bromide. A typical hydrobromic acid solution, extremely useful here will contain about 60 percent hydrogen bromide.

It is important that the reaction temperature exceed at least about 100°C. More often the reaction temperature ranges from about 100°C. to about 140°C., and most typically ranges from 115°C. to about 130°C. One specifically useful range is about 120°C. to 125°C.

Depending upon the particular reactants involved, source of concentrated hydrogen halide, reaction temperature, etc. variables, the time of the reaction may be somewhat varied. An illustrative range of reaction times is from about 12 hours to about 60 hours, and most typically the reaction time ranges from about 18 to about 50 hours. A 24 hour reaction period is one specific example of time necessary to complete the reaction and obtain relatively good yields, particularly when a supersaturated hydrogen bromide solution is utilized.

The 1-substituted-3-halopyrrolidines may be subsequently converted to their amine and quaternary salts, if so desired. Such amine quaternary salts may be used as such, or further reacted for form useful compounds. For example, the 1-methyl-3-bromopyrrolidine methobromide quaternary may be subsequently reacted with the sodium salt of alpha-phenylcyclopentaneglycolic acid to form the above-mentioned glycopyrrolate sold under the trade name "Robinul". Likewise, the 1-methyl-3-bromopyrrolidine may be reacted with the sodium salt of alpha-phenylcyclopentane-glycolic acid and then quaternized with methyl bromide to produce the just-discussed commercial anti-cholinergic compound.

Since self-quaternization occurs to some extent in the hydrobromination reaction, particularly where the 1-substituent is methyl, it has been found useful to first form the quaternary salt of the 1-substituted-Δ³-pyrroline to minimize self-quaternization during the subsequent hydrobromination reaction.

The following examples illustrate typical ways of carrying out the method of the invention. It is understood, of course, that these examples are merely illustrative, and that the invention is not to be limited thereto. All parts and percentages are by weight unless otherwise expressed.

EXAMPLE I

PREPARATION OF CIS-1,4-DICHLOROBUTENE-2

Here, hydrogen chloride was bubbled into 176 g. (2 moles) of 1,4-dihydroxybutene-2. A temperature of 50°C. was maintained by means of an ice bath for the first one-half hour reaction time, at which time the reaction ceased to be exothermic. The temperature was then maintained at 50°C. with external heating for the next seven hours and a continuous stream of hydrogen chloride added into the reaction vessel during this time. The resultant mixture was distilled at 100 mm. of mercury and a pot temperature of about 70°C. The distillate was in two layers which were separated and the bottom layer then extracted with a dilute sodium bicarbonate solution with vigorous shaking. The yield was 183 g. (73 percent).

EXAMPLE II

PREPARATION OF 1-ETHYL-Δ³-PYRROLINE

A 2.1 flask was fitted with a stirrer, thermometer and water-cooled, non-flooding reflux condenser topped with a dry ice-acetone cooled condenser. To 400 ml. of ethylamine was added over a period of 30 minutes 168 g. (1.34 moles) of cis-1,4-dichlorobutene-2, while cooling the reaction vessel with an ice-bath. The pot temperature rose to 52°C. during the amine addition. The ice-bath was removed and the solution was stirred for 20 minutes and 500 ml. of ethyl ether added. The mixture was stirred thoroughly in the ether and then decanted, leaving a solid residue which was washed twice with 250 ml. portions of ether. The ether was concentrated at atmospheric pressure and the product distilled. The yield of this product having a b.p. of 103°C. to 107°C. was 73 g. (57.5 percent).

EXAMPLE III

PREPARATION OF 1-ETHYL-3-BROMOPYRROLIDINE

To 60 ml. of a 48 percent hydrogen bromide solution was added dropwise 19.2 g. (0.193 mole) of 1-ethyl-$\Delta^3$-pyrroline. Additional hydrogen bromide was bubbled in as the temperature was raised to reflux with external heating. The addition of hydrogen bromide and continuation of refluxing was carried out for 16 hours. The reaction mass was poured on ice, made basic with 50 percent sodium hydroxide, and extracted with isopropyl ether. The isopropyl ether was then dried and the product distilled. The product was obtained in a yield of 24.5 g. (71.5 percent) and had a b.p. of 120°C. to 125°C./150 mm. Gas chromatography indicated the product to be pure.

EXAMPLE IV

PREPARATION OF 1-ETHYL-3-BROMOPYRROLIDINE WITHOUT ISOLATING PYRROLINE INTERMEDIATE

Here, a 2.1 flask was equipped with stirrer, thermometer and water-cooled, flooding condenser which was topped with a dry ice condenser. To 500 ml. of ethylamine was added 183 g. (1.46 moles) of cis-1,4-dichlorobutene-2 at a rate sufficient to maintain a vigorous reflux. The solution was stirred an additional 30 minutes and the dry ice condenser removed. The pot was heated with a steam bath while leaving the water flowing through the condenser, thus allowing the ethylamine to be slowly removed. This was continued until the pot temperature reached 80°C. to 90°C. The heat source was then terminated and 500 ml. water added.

The above solution was then heated to reflux as hydrogen bromide gas was bubbled in for 48 hours after saturation occurred. The solution was cooled, poured on ice, made basic with sodium hydroxide and extracted with chloroform. The chloroform was then dried with sodium sulfate, concentrated and distilled. The overall yield based on the starting diol from which the dichlorobutene compound was made was 118.9 g. (33.4 percent). The final product had a b.p. of 105°C. to 112°C./100 mm.

EXAMPLE V

PREPARATION OF 1-BENZYL-$\Delta^3$-PYRROLINE

A solution of 600 ml. of benzene containing 856.9 g. (8.0 moles) of benzylamine was heated to reflux with stirring. The addition of 250 g. (2.0 moles) of 1,4-dichlorobutene-2 required approximately 20 minutes. The reaction temperature was held at approximately 85°C. for another hour. The hot solution was filtered and the filtrate returned to the reaction vessel and cooled to 20°C. Gaseous carbon dioxide was then bubbled through the solution with vigorous stirring. After approximately 40 minutes the solution was filtered, and the filtrate concentrated and distilled at reduced pressure. The fraction distilling at 85°C. to 89°C./3 mm. was collected. The yield was 200.5 g. (1.29 moles, 64.5 percent).

EXAMPLE VI

PREPARATION OF 1-BENZYL-3-BROMOPYRROLIDINE

A reaction solution was prepared by combining 200.5 g. (1.29 moles) of 1-benzyl-$\Delta^3$-pyrroline, 300 ml. of 48 percent hydrobromic acid and 400 g. of ice. The reaction mass was heated to reflux and stirred while bubbling in anhydrous hydrogen bromide over a period of 48 hours. The reflux temperature during most of the reaction time was 125°C.

The reaction mass was cooled to 10°C. and added slowly to a stirred solution of 50 percent sodium hydroxide. An ice bath was used to maintain the temperature below 30°C. during this basification. The organic material was then extracted into a total of about 1 liter of chloroform. The chloroform solution was separated from the aqueous phase and then dried over sodium sulfate. It concentrated and then distilled at a reduced pressure. The fraction distilling at 98°C. to 123°C./0.22 mm. was collected. Ninety per cent of this fraction distilled at 120°C. The yield was 209.1 g. (0.873 mole, 69.8 percent) of product.

EXAMPLE VII

PREPARATION OF 1-METHYL-3-BROMOPYRROLIDINE

A solution of 16.39 g. (0.1 mole) of 1-methyl-$\Delta^3$-pyrroline hydrobromide in 67.5 g. (0.5 mole) of 60 percent hydrogen bromide solution was heated at 120°C. to 125°C. for 24 hours.

After cooling to 25°C., the reaction mixture was adjusted to pH 11 by the addition of 25% sodium hydroxide solution (100 g.). The oil layer was extracted with benzene (2 × 25 ml.), washed with water (10 ml.), and azeotroped dry at atmospheric pressure while charcoaling for 15 minutes. Filtration of the charcoal resulted in a light yellow benzene solution which was analyzed by vapor phase chromatography (yield 3.6 g. of 1-methyl-3-bromopyrrolidine, 22 percent of theory). This benzene solution was carefully gassed with dry hydrogen bromide to pH 7. The amine salt was filtered and recrystallized from acetone to yield 1-methyl-3-bromopyrrolidine hydrobromide, m.p. 92°C. to 93°C.

Anal. Calcd. for $C_5H_{11}Br_2N$: N, 5.72; Br⁻, 32.6; Br, 65.2. Found: N, 5.79; Br⁻, 33.4; Br, 64.6.

EXAMPLE VIII

PREPARATION OF 1-METHYL-$\Delta^3$-PYRROLINE METHOBROMIDE

A solution of 8.3 g. (0.1 mole) of 1-methyl-$\Delta^3$-pyrroline in 100 ml. of methyl ethyl ketone was treated with 9.5 g. of methyl bromide gas. The resulting solid was filtered to yield 17.79 g. 100 percent of theory, of 1-methyl-$\Delta^3$-pyrroline methobromide, m.p. 303°C. to 304°C.

Anal. Calcd. for $C_6H_{12}BrN$: N, 7.88; Br⁻, 44.9; Br, 44.9. Found: N, 8.58; Br⁻, 45.37; Br, 45.40.

EXAMPLE IX

PREPARATION OF 1-METHYL-3-BROMOPYRROLIDINE METHOBROMIDE

A solution of 17.79 g. (0.1 mole) of 1-methyl-$\Delta^3$-pyrroline methobromide in 67.5 g. of 60% hydrogen bromide solution was reacted as described in Example VII. The excess hydrobromic acid was distilled and the residue crystallized from ethyl alcohol (90 ml.) to yield 57% of theory of 1-methyl-3-bromopyrrolidine methobromide, m.p. 190°C. to 191°C.

Anal. Calcd. for $C_6H_{13}Br_2N$: N, 5.4; Br⁻, 30.9; Br, 61.8. Found: N, 5.3; Br⁻, 32.1; Br, 62.9.

EXAMPLE X

PREPARATION OF 1-ETHYL-3-BROMOPYRROLIDINE METHOBROMIDE

This compound was prepared according to the directions of Examples VIII and IX with the exception the starting material was the 1-ethyl-$\Delta^3$-pyrroline derivative. The product was rapidly crystallized from a mixture of methyl ethyl ketone (50 ml.) and ethyl alcohol (10 ml.) and had a m.p. of 134°C. to 135°C.

EXAMPLE XI

PREPARATION OF 1-ETHYL-3-CHLOROPYRROLIDINE

This compound was prepared according to the directions of Example III with the exception that concentrated hydrochloric acid was used to chlorinate the --ethyl-$\Delta^3$-pyrroline. Additional hydrogen chloride was also bubbled in during the reaction.

The 1-ethyl-3-chloropyrrolidine product in hydrochloric salt form had a melting point of 87°C. to 88°C.

It is believed that certain of the above-discussed compounds are novel per se, and particularly the quaternary ammonium salts of the 1-substituted-$\Delta^3$-pyrrolines and 1-substituted-3-halopyrrolidines.

The 1-substituted-$\Delta^3$-pyrrolines may be quaternized with a host of known organic alkylating agents. For example, dimethyl sulfate, methyl chloride, $C_2$–$C_{22}$-alkyl halides such as ethyl chloride, propyl chloride, etc., aralkyl halides as benzyl chloride, substituted benzyl chlorides as dodecyl benzyl chloride, epihalohydrins as epichlorohydrin, lactones as beta-propiolactone, polyoxyalkylene halides, such as polyoxyethylene chloride, etc. may be employed. Alkyl halides such as methyl chloride and methyl bromide and aralkyl halides as benzyl chloride are most preferred quaternizing agents.

The resultant pyrroline quaternaries then have the following structure:

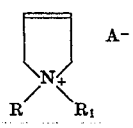

where R is the 1-substituent group and $R_1$ is the organic quaternizing reactant moiety.

As indicated earlier herein, R is a hydrocarbyl group, i.e., an alkyl group having from one to 12 carbons, a phenylalkyl group having from seven to 10 carbons, or a cycloalkyl group having from five to eight carbons. The organic quaternizing group, $R_1$, may also be any of these groups. A in the above formula stands for the anionic counter-ion such as chloride, bromide, etc.

Likewise the quaternaries of the 1-substituted-3-halo-pyrrolidines are believed to the new. Again, the 1-substituted-3-halopyrrolidines may be quaternized with any one of the above-mentioned quaternizing reagents or others. Likewise, the quaternaries of the 1-substituted-$\Delta^3$-pyrrolines may be subsequently hydrohalogenated as demonstrated above to yield the novel quaternaries of the 1-substituted-3-halopyrrolidines. These compounds, of course, have the following general structure:

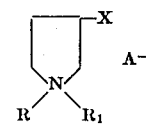

where R, $R_1$ and A are groups as noted above and X is a halo group.

The above products of the invention may be utilized for a wide variety of purposes. Of course, these products are intermediates toward preparation of the sought-after glycopyrrolate when the 1-substituent is methyl. Similar derivatives of this type may be used for preparation of drugs exhibiting a variety of therapeutic effects. Moreover, the compounds may also be used as intermediates in forming a wide variety of organic substances useful in numerous industrial applications. For example, from these compounds may be made corrosion inhibitors, antifoams, polymeric substances of diverse types useful as coagulants, as paper additives, etc., vulcanization accelerators, herbicides, pesticides, scale inhibitors in evaporators, feed water heaters, economizers, boilers and other parts of steam generating systems, microbiocides, antifoulant chemicals, surfactants, coating agents, chemical adjuvants used in treatment of textiles for various purposes, etc. The compounds discovered here may be used not only to prepare derivatives for the just-mentioned uses and others, but in many instances may be directly used for these purposes without further chemical modification or formulation.

While the invention has been discovered in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

WHAT IS CLAIMED IS:

1. A method for preparing a 1-hydrocarbyl-3-halopyrrolidine which comprises the steps of reacting a 1-hydrocarbyl-$\Delta^3$-pyrroline with a concentrated aqueous hydrogen halide solution at a temperature of from about 100°C. to about 140°C. and recovering the 1- hydrocarbyl-3-halopyrrolidine, the hydrocarbyl group being an alkyl group having from one to 12 carbons, a phenylalkyl group having from seven to 10 carbons, or a cycloalkyl group having from five to eight carbons.

2. The method of claim 1 wherein said concentrated hydrogen halide is concentrated hydrochloric acid.

3. The method of claim 1 wherein the concentrated hydrogen halide solution is a supersaturated hydrobromic acid solution containing greater than about 55 percent hydrogen bromide.

4. The method of claim 3 wherein the concentrated aqueous hydrogen halide solution contains about 60 percent hydrogen bromide.

5. The method of claim 1 wherein the hydrocarbyl group is an alkyl group.

6. The method of claim 5 wherein the alkyl group is a methyl group.

7. The method of claim 5 wherein the alkyl group is an ethyl group.

8. The method of claim 1 wherein the hydrocarbyl group is a phenylethyl group.

9. The method of claim 8 wherein the phenylethyl group is a benzyl group.

10. The method of claim 1 wherein the reaction is carried out for 12–60 hours.

11. The method of claim 10 wherein the reaction temperature is 115°C. to 130°C. and the reaction is carried out for 18–50 hours.

12. The method of claim 3 wherein the hydrocarbyl group is an alkyl group.

13. The method of claim 12 wherein the alkyl group is a methyl group.

14. The method of claim 12 wherein the alkyl group is an ethyl group.

15. The method of claim 3 wherein the hydrocarbyl group is a phenylethyl group.

16. The method of claim 15 wherein the phenylethyl group is a benzyl group.

17. The method of claim 3 wherein the reaction is carried out for 12–60 hours.

18. The method of claim 17 wherein the reaction temperature is 115°C.–130°C. and the reaction is carried out for 18–50 hours.

19. The method of claim 1 wherein the 1-substituted-$\Delta^3$-pyrroline reactant is prepared by cyclization of cis-1,4-dihalobutene-2 with a primary amine wherein the organic group is an alkyl group having from one to 12 carbons, a phenylalkyl group having from seven to 10 carbons, or a cycloalkyl group having from five to eight carbons.

20. The method of claim 19 wherein the primary amine is methylamine.

21. The method of claim 19 wherein the primary amine is ethylamine.

22. The method of claim 19 wherein the primary amine is benzylamine.

23. The method of claim 19 wherein cis-1,4-dichlorobutene-2 is cyclized.

24. The method of claim 3 wherein the 1-substituted-$\Delta^3$-pyrroline reactant is prepared by cyclization of cis-1,4-dihalobutene-2 with a primary amine.

25. The method of claim 24 wherein the primary amine is methylamine.

26. The method of claim 24 wherein the primary amine is ethylamine.

27. The method of claim 24 wherein the primary amine is benzylamine.

28. The method of claim 24 wherein cis-1,4-dichlorobutene-2 is cyclized.

29. The method of claim 17 wherein the 1-substituted-$\Delta^3$-pyrroline reactant is prepared by cyclization of cis-1,4-dihalobutene-2 with a primary amine.

30. The method of claim 29 wherein the primary amine is methylamine.

31. The method of claim 29 wherein the primary amine is ethylamine.

32. The method of claim 29 wherein the primary amine is benzylamine.

33. The method of claim 29 wherein cis-1,4-dichlorobutene-2 is cyclized.

34. The method of claim 19 wherein the 1-substituted-$\Delta^3$-pyrroline intermediate is isolated prior to reaction with the concentrated hydrogen halide.

35. The method of claim 19 wherein the 1-substituted-$\Delta^3$-pyrroline intermediate is not isolated from the reaction mass prior to reaction with the concentrated hydrogen halide.

36. The method of claim 1 wherein the 1-substituted-$\Delta^3$-pyrroline is first quaternized prior to reaction with the hydrogen halide.

37. The method of claim 36 wherein the hydrocarbyl group is a methyl group.

38. The method of claim 37 wherein the 1-methyl-$\Delta^3$-pyrroline is quaternized with methyl bromide prior to reaction with the halogen halide.

* * * * *